(12) United States Patent
Tyan et al.

(10) Patent No.: US 6,605,330 B2
(45) Date of Patent: Aug. 12, 2003

(54) PHASE-CHANGE RECORDING ELEMENT FOR WRITE ONCE APPLICATIONS

(75) Inventors: Yuan-Sheng Tyan, Webster, NY (US); Thomas R. Cushman, Rochester, NY (US); Giuseppe Farruggia, Webster, NY (US); George R. Olin, Webster, NY (US); Bruno Primerano, Walworth, NY (US); Fridrich Vazan, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 71 days.

(21) Appl. No.: 10/010,784

(22) Filed: Nov. 13, 2001

(65) Prior Publication Data

US 2003/0099805 A1 May 29, 2003

(51) Int. Cl.$^7$ .................................................. B32B 3/02
(52) U.S. Cl. ..................... 428/64.1; 428/64.4; 428/64.5; 430/270.13
(58) Field of Search .......................... 428/64.1, 64.2, 428/64.5, 64.6, 913; 430/270.13, 495.1, 945; 369/283, 288

(56) References Cited

U.S. PATENT DOCUMENTS

| 4,774,170 | A | | 9/1988 | Pan et al. |
|---|---|---|---|---|
| 4,795,695 | A | | 1/1989 | Pan et al. |
| 4,798,785 | A | | 1/1989 | Pan et al. |
| 4,812,386 | A | | 3/1989 | Pan et al. |
| 4,865,955 | A | | 9/1989 | Pan et al. |
| 4,904,577 | A | | 2/1990 | Tyan et al. |
| 4,960,680 | A | | 10/1990 | Pan et al. |
| 5,077,181 | A | | 12/1991 | Pan et al. |
| 5,234,803 | A | * | 8/1993 | Raychaudhuri ............. 430/495 |
| 5,271,978 | A | * | 12/1993 | Vazan et al. .................. 428/64 |
| 5,312,664 | A | | 5/1994 | Raychaudhuri |
| 5,721,978 | A | | 2/1998 | Saito |

* cited by examiner

*Primary Examiner*—Elizabeth Mulvaney
(74) *Attorney, Agent, or Firm*—Raymond L. Owens

(57) ABSTRACT

A WORM optical recording element comprising a substrate and a phase-change recording layer wherein the phase-change recording layer has a composition expressed by $Sb_aX_bSn_cZn_dSi_eO_fS_h$ wherein X is an element selected from In, Ge, Al, Zn, Mn, Cd, Ga, Ti, Si, Te, Nb, Fe, Co, W, Mo, S, Ni, O, Se, Tl, As, P, Au, Pd, Pt, Hf, or V and $a>0$, $b>0$, $c>0$, $d>0$, $e>0$, $f>0$, $h>0$, and $a+b+c+d+e+f+h=100$.

5 Claims, 5 Drawing Sheets

PHASE-CHANGE RECORDING ELEMENT FOR WRITE ONCE APPLICATIONS

CROSS REFERENCE TO RELATED APPLICATION

Reference is made to commonly assigned U.S. patent application Ser. No. 09/925,751 filed Aug. 9, 2001, entitled "Phase-Change Recording Element for Write Once Applications" by Tyan et al, the disclosure of which is incorporated herein.

FIELD OF THE INVENTION

The present invention relates to a phase-change optical recording element that is particularly suitable for write-once read-many times (WORM) applications.

BACKGROUND OF THE INVENTION

Optical recording has been increasingly used in recent years to publish, distribute, store, and retrieve digital information. This is done by focusing a laser beam to write and/or read information on an optical recording element usually in the form of a spinning disk. In the read-only memory (ROM) format, the information is prefabricated at the factory in the form of encoded small features on the element and the laser beam is used to read back the information. In the writeable formats, the laser beam is used to create small encoded marks through a variety of physical recording mechanisms. This permits the users to record their own data on the disk. Some recording physical mechanisms are reversible. The recorded marks can be erased and remade repeatedly. Disks that utilize these mechanisms are called erasable or rewriteable disks. Some of these physical mechanisms are one way, once the marks are made they cannot be reversed or altered without leaving a clearly identifiable trace that can be detected. Disks that utilize these mechanisms are called WORM (Write-Once-Read-Many times) disks. Each of these formats is suitable for certain practical applications.

The popularity of compact disk recordable (CD-R), which is a WORM disk, in recent years suggests the strong demand for WORM disks. WORM disks are suitable for many applications. In some of these applications, the data need to be stored in such a form that any modification to the content is not possible without leaving an easily detectable trace. For example, attempts to record over a previously recorded area may result in an increase in the read-back data jitter. An increase in data jitter of 50% is easily detectable and can be used to identify a recording element that has been modified. Recording elements that possess features that allow detection of modification attempts are hereto referred to as true-WORMs. In some other applications such publishing and data distribution, rewriteability is not necessary and the lower cost of WORM recording element makes them desirable. Yet, in some other applications some performance advantages of WORM recording elements, such as a higher writing speed, becoming the determining feature in choosing WORM over rewriteable elements.

Many physical mechanisms have been used for WORM recording. The first practical WORM optical recording element utilized ablative recording where the pulsed laser beam is used to create physical pits in the recording layer. This mechanism requires the recording elements to be in an air-sandwiched structure to leave the surface of the recording layer free from any physical obstruction during the pit formation process. This requirement not only increases the cost-but also introduces many undesirable properties that severely limit the usefulness of the recording element. Another mechanism is to use the laser beam to cause the fusing or chemical interaction of several layers into a different layer. This mechanism suffers from the requirement of relatively high laser power.

Yet another approach is to use organic dye as the recording layer. Although used successfully in CD-R disks, this mechanism suffers from its strong wavelength dependence. The optical head used in the DVD devices operating at 650 nm, for example, is not able to read the CD-R disks designed to work at the CD wavelength of 780 nm. Furthermore, a dye-based recording element tends to require more laser power for recording, and may have difficulties supporting recording at high speeds.

A more desirable approach is based on amorphous-crystalline phase-change mechanism. Phase-change material is the basis for the rewriteable DVD disks that have been introduced as DVD-RAM and DVD-RW products in the market. By properly selecting a different composition, the phase-change materials can be made WORM as well. A phase-change based DVD-WORM disk will have the best similarity in characteristics with the rewriteable DVD disks, and it can share the same manufacturing equipment with the re-writable disks. Both of these are highly desirable. Since the WORM feature requires disks that cannot be re-written, the phase-change materials for WORM needs to be different from those conventionally used for rewriteable disks. Commonly-assigned U.S. Pat. Nos. 4,904,577; 4,798,785; 4,812,386; 4,865,955; 4,960,680; 4,774,170; 4,795,695; 5,077,181 and 5,271,978, teach various alloys that can be used for write-once phase-change recording. When these alloys are used to construct a WORM optical recording element, the recording laser beam is used to change the atomic structure of the recording phase-change material from amorphous state to crystalline state. The unique feature that distinguishes these alloys from the conventional rewriteable phase-change materials is that the crystallization rate is so high at elevated temperatures just below the melting point, it is practically impossible to reverse the materials back into the amorphous phase once it is crystallized. Optical elements based on these alloys therefore possess true-WORM properties. Once the data are recorded on these elements, they cannot be altered without leaving a detectable trace. Optical recording elements based on these alloys, especially the ones using $Sb_{100-m-n}X_mSn_n$ based alloys, wherein, X is an element is selected from In, Ge, Al, Zn, Mn, Cd, Ga, Ti, Si, Te, Nb, Fe, Co, W, Mo, S, Ni, O, Se, Tl, As, P, Au, Pd, Pt, Hf, or V, as taught by commonly-assigned U.S. Pat. Nos. 4,904,577; 4,798,785; 4,812,386; 4,865,955; 4,960,680; 4,774,170; 4,795,695; 5,077,181 and 5,271,978, m and n represent the concentration of X and Sn in the alloy, have further advantages over other WORM optical recording elements. They are stable, having high recording sensitivity, and can be used in a simple, single-layer construction that drastically reduces manufacturing costs. However, recording elements based on these alloys also posses some shortcomings. One of the main shortcomings is the recent discovery that the recording performance of these elements deteriorates as the recording density is increased.

With the transition into the digital age, more and more digital data are generated everyday, and the need to store these ever increasing amounts of data keeps on increasing. There is therefore a strong need to keep increasing the density of the storage devices. In optical recording elements, this increase in density is achieved mainly through a decrease in the feature size used for storing information. To accomplish this decrease in feature size, the laser wavelength is being decreased and the numerical aperture of the focusing lenses is being increased to reduce the size of the read/write laser spots. However, the capability of the storage medium to support the small feature size is not guaranteed. In the ablative type media, frequently there is a rim around the ablative marks that physically prevents small features from being made. In the $Sb_{100-m-n}X_mSn_n$ phase-change alloys taught above, the noise increases when the recorded crystalline marks become smaller. The mechanism for this noise increase is not well understood. Transmission electron micrographs show the recorded marks in these alloys to generally consist of only a few crystalline grains, suggesting a low nucleation-site density in these alloy films. The low nucleation density has not presented a problem for lower density recording. When the recording density increases, however, the marks become smaller and the probability of proper nucleation during the irradiation time of the writing laser becomes smaller. Consequently, the recorded marks may become less uniform and the read back jitter increases. Adding oxygen (commonly-assigned U.S. Pat. No. 5,271, 978), water, nitrogen, or methane (commonly-assigned U.S. Pat. Nos. 5,312,664 and 5,234,803) to $_{these}$ alloys improves the situation somewhat, but the small mark recording is still a problem.

Another shortcoming of the $Sb_{100-m-n}X_mSn_n$ alloy is the high optical density of the alloys. For certain applications, it is desirable to construct a multi-layer structure and utilize optical interference to enhance recording performance or to change the polarity of the recorded signals. For example, one can use a tri-layer structure comprising a phase-change recording layer, a dielectric layer, and a reflective layer; or a quadri-layer structure with an additional dielectric layer on the other side of the phase-change recording layer. For the optical interference to work, a substantial amount of light has to transmit through the phase-change layer and, therefore, the thickness of the phase-change layer has to be small. The required thickness decreases with increasing optical density of the phase-change layer. The $Sb_{100-m-n}X_mSn_n$ alloys have high optical absorption, with the imaginary part of the optical constant, k, larger than 3.0 in the amorphous phase and it increases to even higher values when the material crystallizes. When a $Sb_{100-m-n}X_mSn_n$ alloy thin film is used as the recording layer for a tri-layer or quadri-layer recording element, its thickness has to be so small that concern arises with respect to the film's chemical stability. For operating at 650 nm wavelength, for example, the thickness of the phase-change recording layer needs to be less than 10 nm. The thickness of the dielectric layer also depends on the optical density of the phase-change layer: the thickness increases as the optical density increases. Since the deposition rates for dielectric layers are smaller than those for alloys, the need for a relative thick dielectric layer reduces the manufacturing throughput and increases product costs. The deposition process for dielectric layers are also hotter than that for alloys, long deposition time used for thick dielectric layers causes unwanted heating of the substrates. The high optical density of the $Sb_{100-m-n}X_mSn_n$ necessitates the use of thicker dielectric layer as well.

Furthermore, for some applications, it is necessary to use the differential-phase detection signal (DPD) for tracking. It has been found recently that tri-layer or quadri-layer recording elements using the $Sb_{100-m-n}X_mSn_n$ alloy do not have adequate DPD signal for reliable tracking.

SUMMARY OF THE INVENTION

It is therefore an object of the present invention to provide an improved, phase-change based WORM recording element that can support higher recording densities.

It is a further object of the present invention to provide an improved, phase-change material with lower optical densities to enable the construction of a WORM recording element in a tri-layer or quadri-layer structure that is more stable and easier to manufacturer.

It is yet another object of the present invention to provide an improved, phase-change based WORM recording element with improved differential-phase detection (DPD) signal.

These objects are achieved by using a WORM optical recording element comprising a substrate and a phase-change recording layer wherein the phase-change recording layer has a composition expressed by $Sb_aX_bSn_cZn_dSi_eO_fS_h$ wherein X is an element is selected from In, Ge, Al, Zn, Mn, Cd, Ga, Ti, Si, Te, Nb, Fe, Co, W, Mo, S, Ni, O, Se, Tl, As, P, Au, Pd, Pt, Hf, or V, and a>0, b>0, c>0, d>0, e>0, f>0, h>0, and a+b+c+d+e+f+h=100. Most preferably, the phase-change layer has a composition expressed by $Sb_aIn_bSn_cZn_dSi_eO_fS_h$ wherein a>0, b >0, c >0, d>0, e >0, f>0, h>0, and a+b+c+d+e+f+h=100.

DETAILED EXPLANATION OF THE INVENTION

Figure 1:
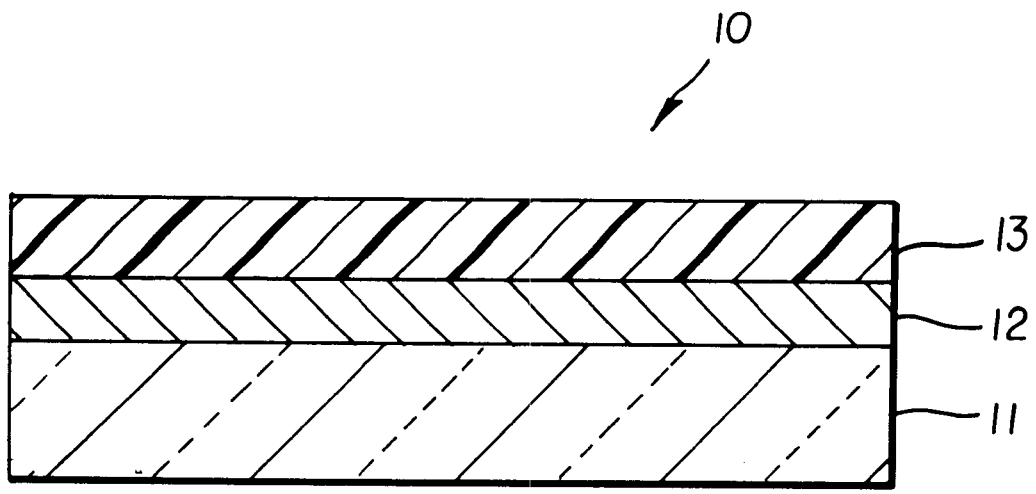
FIG. 1 is a schematic representation, in cross-sectional view, of a WORM optical recording element that can be made in accordance with the present invention wherein the element has a single-layer structure.

FIG. 1 is a schematic representation, in cross-sectional view, of a WORM optical recording element 10 that can be made in accordance with the present invention.

As shown in FIG. 1, for optical recording medium 10 of this invention, a phase-change recording layer 12 is formed on one side of the substrate 11. In addition, there can be a protecting layer 13 formed on the surface of the phase-change recording layer 12. The substrate 11 can be made of a metal, such as aluminum, a glass, or a polymer, such as polycarbonate or polymethyl methacrylate. On the surface where the phase-change recording layer 12 is coated there can be a guide groove for the read/write laser beam to follow. The protecting layer 13 can be made of an UV-curable lacquer. In cases where an opaque substrate such as aluminum is used, the read/write laser beam is irradiated onto the surface of the recording layer 12. In cases where the substrate 11 used is transparent, the read/write laser beam can be illuminated either on the surface of the recording film 12 or through the substrate 11.

Figure 2:
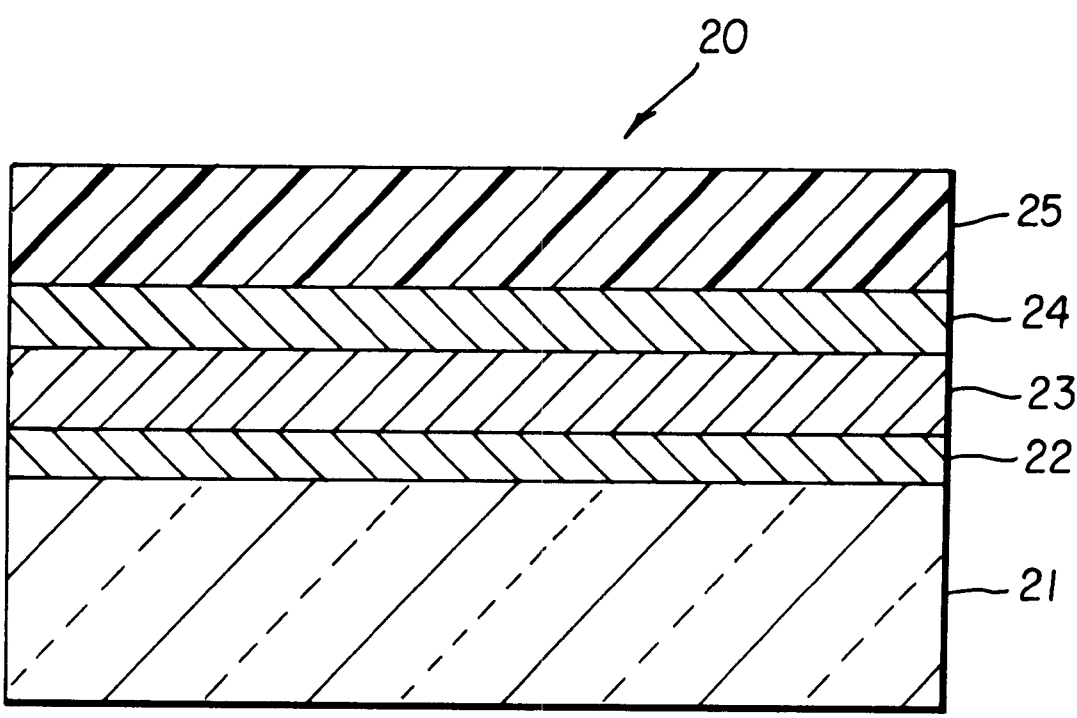
FIG. 2 is a schematic representation, in cross-sectional view, of another WORM optical recording element that can be made in accordance with the present invention wherein the element has a tri-layer structure.

FIG. 2 is a schematic representation, in cross-sectional view, of an alternative WORM optical recording element 20 that can be made in accordance with the present invention. As shown in FIG. 2, there is a substrate 21, a phase-change recording layer 22, a dielectric layer 23, a reflective layer 24, and, optionally, a protective layer 25. The substrate 21 can be made of a glass or a plastic such as polycarbonate or polymethyl methacrylate. There can be a guide groove on the surface where the phase-change recording layer 22 is applied. The dielectric layer 23 can be an oxide, such as silicon oxide or aluminum oxide; a nitride, such as silicon nitride or aluminum nitride; a sulfide, such as zinc sulfide. The dielectric layer 23 can also be a mixture of different materials such as a mixture of ZnS and $SiO_2$. The reflective layer 24 can be a metallic layer, such as Al, Ag, or Ti. The protective layer 25 can be an UV-curable lacquer layer. The thickness of the phase-change recording layer 22 and the dielectric layer 23 is selected to optimize the recording performance and the recording contrast. For example, for 650 nm laser wavelength applications, with a recording layer according to the present invention the phase-change recording layer 22 can have a thickness of about 15 nm. The dielectric layer 23 can have a thickness of about 40 nm. In this case, the recorded marks have a higher reflectivity than the unrecorded region. The dielectric layer 23 can also be selected to be about 70 nm, in this case the recorded marks have a reflectivity lower than that of the unrecorded region.

Figure 3:
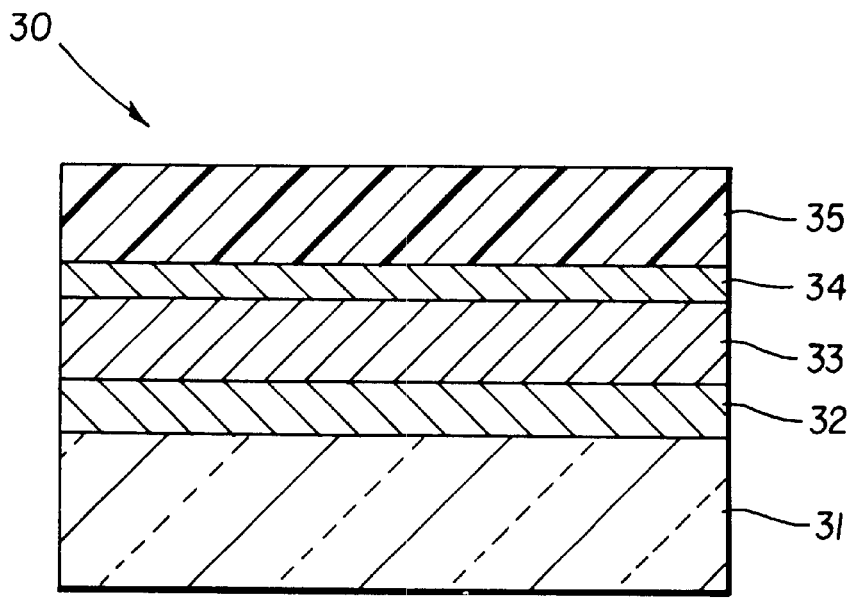
FIG. 3 is a schematic representation, in cross-sectional view, of another WORM optical recording element that can be made in accordance with the present invention wherein the read/write laser beam is illuminated from the front surface of the element.

FIG. 3 is schematic representation, in cross-sectional view, of another alternative WORM optical recording element 30 that can be made in accordance with the present invention. In this case the reflective layer 32 is applied next to the substrate 31, follow by a dielectric layer 33, a phase-change recording layer 34, and, optionally, a protective layer 35. In this construction, the materials and the thickness of the layers can be similar to that in FIG. 2, but the substrate material can be nontransparent and the read/write laser beam is irradiated through the protective layer 35, or directly onto the phase-change recording layer 34 if there is no protective layer 35.

Figure 4:
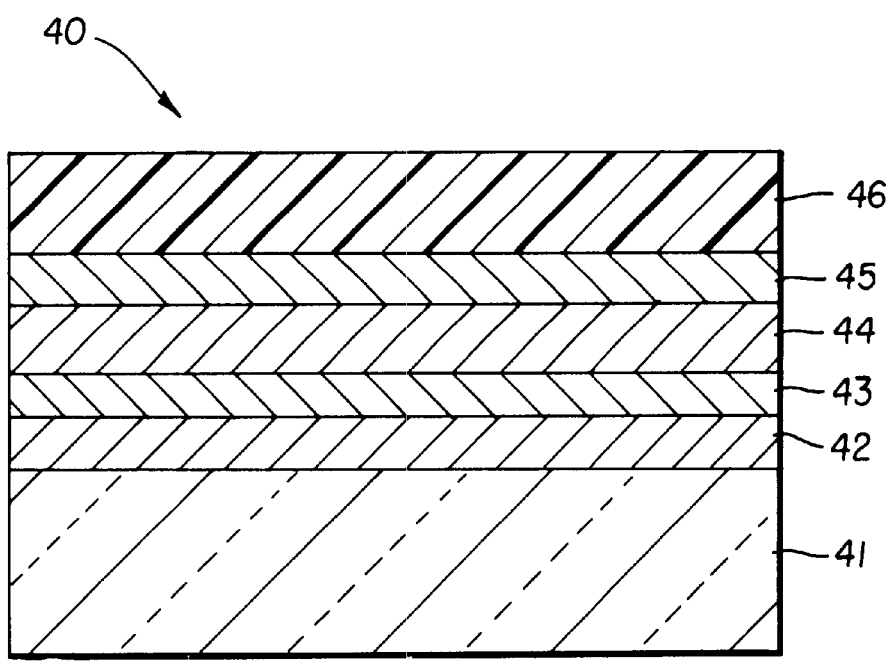
FIG. 4 is a schematic representation, in cross-sectional view, of another WORM optical recording element that can be made in accordance with the present invention wherein the element has a quadri-layer structure.

FIG. 4 is yet another implementation of the present invention. In this implementation, the recording element 40 is constructed similar to that in FIG. 2 except for an additional dielectric layer 42. Starting from the substrate 41, there is a dielectric layer 42, a phase-change recording layer 43, a second dielectric layer 44, a reflective layer 45, and, optionally, a protective layer 46. The read/write operation is through the transparent substrate. The additional dielectric layer 42 is used to further optimize the optical and thermal properties of the recording element in order to achieve the desired properties.

Other recording elements can be constructed using the recording materials according to the present invention. Depending on the detailed construction of the recording elements, the laser-induced phase change can cause an increase in reflectivity, a decrease in reflectivity, or a change in the phase of the reflected beam from the surrounding un-recorded areas.

According to the present invention, the phase-change recording layer in these elements is made at least of antimony (Sb), tin (Sn), zinc (Zn), sulfur (S), silicon (Si), oxygen (O), and X wherein X is an element selected from In, Ge, Al, Zn, Mn, Cd, Ga, Ti, Si, Te, Nb, Fe, Co, W, Mo, S, Ni, O, Se, Tl, As, P, Au, Pd, Pt, Hf, or V. For example, commonly-assigned U.S. Pat. No. 4,960,680 teaches the construction of WORM recording elements containing a $Sb_{100-m-n}In_mSn_n$ alloy, where m and n are concentration of In and Sn in the alloy, respectively, expressed in atomic percentages. The values of m and n are selected to have the composition of the alloy in the preferred range as taught by commonly-assigned U.S. Pat. No. 4,960,680 and shown in FIG. 5 and Table 1 of the present invention. The $Sb_{100-m-n}In_mSn_n$ alloy has many desirable properties, and it has been used successfully in several commercial products. It has been discovered unexpectedly that adding Zn, S, Si, and O into the $Sb_{100-m-n}In_mSn_n$ alloys results in significant improvements in recording performance. The improvements include the capability to support higher density recording, a lower optical density, and a higher DPD tracking signal for the tri-layer and quadri-layer elements.

Conventional $Sb_{100-m-n}X_mSn_n$ alloys thin-films are amorphous in structure as prepared. When these thin-films are used for optical recording, the writing laser beam is used to transform the amorphous phase into crystalline marks. Transmission electron micrographs of these recorded marks generally show them to consist of only a few crystalline grains. This suggests a low nucleation-site density in these alloy films. The low nucleation density has not presented a problem for lower density recording. When the recording density increases, however, the marks become smaller and the probability of proper nucleation during the irradiation time of the writing laser becomes smaller. As a result, the recorded marks become less uniform and the read back jitter increases. The adding of oxygen (commonly-assigned U.S. Pat. No. 5,271,978), water, nitrogen, or methane (commonly-assigned U.S. Pat. Nos. 5,312,664 and 5,234,803) to $Sb_{100-m-n}X_mSn_n$ alloy improves the situation somewhat, but the small mark recording is still a problem. The present inventors discovered that adding Zn, S, Si, and O into the $Sb_{100-m-n}X_mSn_n$ alloys is most effective in improving the small mark jitter.

The adding of Zn, S, Si, and O into the $Sb_{100-m-n}X_mSn_n$ alloys can be accomplished in many ways. One of the most convenient ways, at least for studying the effect of the addition, is to prepare the recording layer using a co-sputtering technique. The recording layer is prepared by sputtering simultaneously from two targets: one containing a $Sb_{100-m-n}X_mSn_n$ alloy and the other containing a $ZnS:SiO_2$ mixture. The $Sb_{100-m-n}X_mSn_n$ alloy is selected to have a composition within the preferred range as taught by commonly-assigned U.S. Pat. Nos. 4,904,577; 4,798,785; 4,812,386; 4,865,955; 4,960,680; 4,774,170; 4,795,695; 5,077,181 and 5,271,978. For example, when In is used as X, the composition is selected to be within the polygon shown in FIG. 5, as taught by commonly-assigned U.S. Pat. No. 4,960,680. The $ZnS:SiO_2$ is a dielectric material commonly used in fabricating phase-change recording layers. The composition of the recording layer prepared this way can be expressed by the formula $(Sb_{100-m-n}X_mSn_n)_{100-x}((ZnS)_{100-y}(SiO_2)_y)_x$ wherein x is a measure of the amount of mixing of the dielectric into the final alloys and y indicates the composition of the dielectric. The composition of the final alloy can be adjusted by changing the compositions of the starting targets as well as by changing the relative sputtering rate from the two targets. As demonstrated by examples later, the improvement in recording performances was found over a large range of x and y values.

The co-sputtered phase-change film is amorphous in structure containing a mixture of all the atomic specifies from the two substrates. There is no evidence for the existence of the original ZnS, SiO2, or $(Sb_{100-m-n}X_mSn_n)$ identity. The present inventors, therefore, expect that other methods of mixing Zn, S, Si, and O into the $(Sb_{100-m-n}X_mSn_n)$ will also be possible. They also expect that other ratios of Zn:S or Si:O will also be effective. There does appear to be a synergistic effect among the elements added, however, as adding the ZnS, $Sio_2$, Zn, Si, or O alone did not produce the desired improvement in recording performance. The desired phase-change recording layer is therefore expressed by the formula $Sb_aX_bSn_cZn_dSi_eO_{fSh}$ wherein X is an element selected from the In, Ge, Al, Zn, Mn, Cd, Ga, Ti, Si, Te, Nb, Fe, Co, W, Mo, S, Ni, O, Se, Tl, As, P, Au, Pd, Pt, Hf, or V and a>0, b>0, c>0, d>0, e>0, f>0, h>0, and a+b+c+d+e+f+h=100. In particular, it has been found most desirable to use In as X.

In addition to improving the small mark recording performance, the adding of Zn, S, Si, and O into the SbSnX alloys results in other changes which can be used beneficially in constructing optical recording elements. One beneficial effect of the addition is to change the optical constants of the phase-change recording layer. SbSnX alloy thin-films are optically dense, with the extinction coefficient, k, over 3.0. The adding of Zn, S, Si, and O results in a drastic decrease in k and hence the films are optically more transparent. This reduction in k is desirable. For example, when these films are used to construct an optimized tri-layer element 20 in FIG. 2, the thickness of the phase-change layer recording 22 is larger and the thickness of the dielectric layer 23 is smaller than when the recording layer with a smaller k is used. A thicker phase-change film is preferable since very thin phase-change films tend to behave differently from their bulk or thick-film counterparts and thinner films tend to be more prone to corrosion and oxidation. On the other hand, a thinner dielectric layer is desirable, since dielectric films generally have low deposition rates that causes low fabrication throughput in manufacturing. In addition, the RF-sputtering process used for fabricating the dielectric films generates a large amount of heat. The heating and the resulting distortion of the substrates can be excessive if thick films are fabricated by the RF-sputtering process.. Both of these factors are undesirable.

The addition of Zn, S, Si, and O into the SbSnX alloys also improves the Differential Phase Detection (DPD) tracking signal in a tri-layer structure constructed to yield low reflectivity marks. DPD is the standard tracking method for DVD format disks. Recording elements constructed of SbSnX alloys generally have DPD signal amplitudes too small to meet the DVD specifications.

Although the mechanism is not well understood, the addition of Zn, S, Si, and O into the SbSnX alloys drastically increases the DPD amplitude and enables the recording element to meet the DVD specifications.

Figure 5:
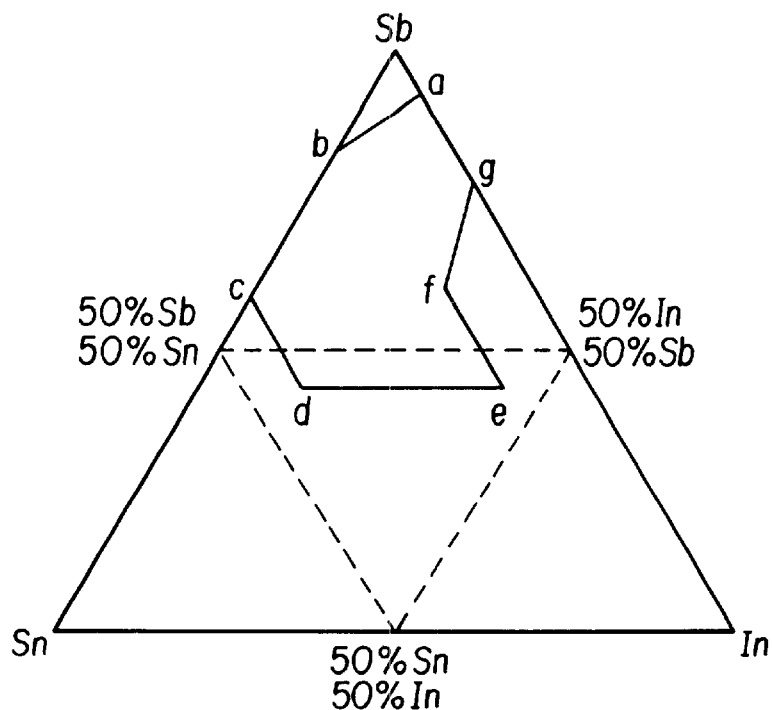
FIG. 5 is a ternary composition diagram of antimony, indium, and tin showing the preferred composition range to be used with the present invention.

The practice of the invention is further described in the following examples. It is to be noted that, although the examples used exclusively the $Sb_{75}In_{15}Sn_{15}$ composition as the basis for the addition of Zn, S, Si, and O, it is believed that all compositions within the range taught by commonly-assigned U.S. Pat. No. 4,960,680 are useful for applying the present invention. FIG. 5 is a compositional diagram showing the preferred range of composition within the Sb, Sn, In alloy system and TABLE 1 shows the composition of the vertices. Furthermore, because of the recording behavior of all $Sb_{100-m-n}X_mSn_n$ alloys, the addition of Zn, S, Si, and O into $Sb_{100-m-n}X_mSn_n$ alloys wherein X is not In will cause similar beneficial effects.

TABLE 1

| Vertices | Coordinates | | |
|---|---|---|---|
| | Sb | Sn | In |
| a | 97 | 0 | 3 |
| b | 85 | 15 | 0 |
| c | 60 | 40 | 0 |
| d | 48 | 42 | 10 |
| e | 44 | 10 | 46 |
| f | 64 | 5 | 31 |
| g | 70 | 0 | 30 |

EXAMPLE 1

A series of seven recording layers were prepared by co-sputtering from two sputtering targets. The first target was an alloy with a composition of $Sb_{75}In_{15}Sn_{15}$ and the second target had a composition of ZnS:20% $SiO_2$. DC sputtering was used for the $Sb_{75}In_{15}Sn_{15}$ target and RF sputtering was used for the ZnS:20% $SiO_2$ target. The sputtering power was adjusted such that the sputtering rate ratio, R, from the ZnS:20% $SiO_2$ target to that from the $Sb_{75}In_{15}Sn_{15}$ target was varied between a value of zero to about 1.31. The sputtering was carried out in about 7 mTorr of Ar and the thickness of the phase-change layer was about 200 nm. These films were analyzed for chemical composition using the Inductively Coupled Plasma (ICP) method, and the results are summarized in Table 2. Note that the ICP method is only capable of detecting the metallic and semi-conducting elements in the films. The reported values in Table refer to percentages calculated based on metallic and semiconducting elements only, excluding oxygen and sulfur. Based on the composition of the target material, the concentration of oxygen in the films is expected to be about half of Si and the concentration of sulfur is expected to be about equal to that of Zn.

TABLE 2

| Sample # | Sputtering Rate Ratio | Concentration, %, Measured by ICP | | | | |
|---|---|---|---|---|---|---|
| | R | Zn | Sb | In | Sn | Si |
| 1 | 1.31 | 45.70 | 31.97 | 7.54 | 6.89 | 7.91 |
| 2 | 1.09 | 42.21 | 34.92 | 7.99 | 7.56 | 7.33 |
| 3 | 0.86 | 36.90 | 39.39 | 8.89 | 8.47 | 6.32 |
| 4 | 0.62 | 30.85 | 44.51 | 9.97 | 9.51 | 5.16 |
| 5 | 0.39 | 21.96 | 51.85 | 11.46 | 11.12 | 3.61 |
| 6 | 0.15 | 9.95 | 61.56 | 13.86 | 13.00 | 1.62 |
| 7 | 0.00 | 0.07 | 69.08 | 15.56 | 15.29 | 0.00 |

This example demonstrates that co-sputtering is an effective method to add Zn, S, Si, and O into the SbSnIn alloy and to produce recording layers containing all relevant elements. It also demonstrates that the sputtering rate ratio, R, is an effective indicator of composition for films prepared by co-sputtering from two fixed-composition targets.

EXAMPLE 2

A WORM optical recording element 10 was constructed according to FIG. 1. The substrate 11 in the form of a disk was made of injection molded polycarbonate with a thickness of about 0.6 mm. On one surface of the disk, there was molded a continuous spiral groove that extended from the inside diameter of the disk to the outside diameter of the disk. The groove was used to guide the laser beam to record and read-back of the data. The groove had a track-pitch of about 0.74 μm, similar to what is used for the DVD format disks. Onto this grooved surface, a phase-change recording layer 12 was deposited by co-sputtering from two sputtering targets. The first target was an alloy with a composition of $Sb_{75}In_{15}Sn_{15}$ and the second target had a composition of ZnS:20% SiO2. DC sputtering was used for the $Sb_{75}In_{15}Sn_{15}$ and RF sputtering was used for the ZnS:20% $SiO_2$ target. The sputtering power was adjusted such that the sputtering rate ratio, R, from the ZnS:20% $SiO_2$ target to that from the $Sb_{75}In_{15}Sn_{15}$ target was about 0.65. The sputtering was carried out in about 7 mTorr of Ar and the thickness of the phase-change layer was about 84 nm. Finally, an UV-cured lacquer layer 13 was applied over the phase-change layer to provide mechanical protection for the recording element.

For comparison, another WORM recording element 10' was prepared according to FIG. 1. All the components and procedures were similar to the element described above except that the recording layer was prepared by sputtering from the $Sb_{75}In_{15}Sn_{15}$ target only. The recording layer had therefore a composition of $Sb_{75}In_{15}Sn_{15}$, similar to that in the target, and R=0.

The recording performance of the recording elements 10 and 10' was evaluated using a commercially available Pulstec DDU-1000 DVD tester equipped with a 635 nm wavelength laser and a 0.6 NA objective. A random EFM+ data pattern was recorded on the disk while it was spinning to yield a linear speed of 8.8 m/s, which is about 2.5 times the read speed of a standard DVD disk. A multi-pulse write-strategy was used for recording. For the shortest 3T marks a single layer pulse was used and for the longer nT marks, additional (n−3) pulses were added. The duration of the pulses was optimized to yield minimum read-back jitter values. The clock rate for the recording pulses were varied in order to yield recorded marks of different sizes. The recorded data were than read back on another Pulstec DDU-1000 DVD tester equipped with a 650 nm wavelength and a 0.6 NA objective. This latter tester has been calibrated against the reference tester for testing DVD media against specifications. The figure-of-merit used in the evaluation is the read-back data-to-clock jitter. The data-to-clock jitter number is a measure of uncertainty in reading back and decoding the recorded data. This quantity is expressed in nanoseconds and the smaller the jitter number the better is the recording performance.

Table 3 shows the dependence of read-back data-to-clock jitter, in nanoseconds, on the size of 3T marks for the two types of recording elements. The one with R=0 used the prior art $Sb_{75}In_{15}Sn_{15}$ composition and the one with R=0.65 used a phase-change recording layer according to the present invention. It is clearly seen that the measured data-to-clock jitter for the recording element 10 with R=0.65 was consistently lower than that for the recording element 10' with R=0.

TABLE 3

| 3T Mark Size, μm | Data-to-Clock Jitter, nS | |
|---|---|---|
| | R = 0 | R = 0.65 |
| 0.50 | 3.3 | 2.4 |
| 0.45 | 3.4 | 2.8 |
| 0.43 | 4.4 | 3.1 |
| 0.41 | 5.2 | 4.5 |

EXAMPLE 3

A WORM optical recording element 20 was constructed according to FIG. 2. The substrate 21 in the form of a disk was made of injection molded polycarbonate with a thickness of about 0.6 mm. On one surface of the disk, there was molded a continuous spiral groove that extended from the inside diameter of the disk to the outside diameter of the disk. The groove was used for guiding the laser beam for recording and read-back of the data. The groove had a track-pitch of about 0.74 μm, similar to what is used for the DVD format disks. Onto this grooved surface, a phase-change recording layer 22 was deposited by co-sputtering from two sputtering targets. The first target was an alloy with a composition of $Sb_{75}In_{15}Sn_{15}$ and the second target had a composition of ZnS:20% $SiO_2$. DC sputtering was used for the $Sb_{75}In_{15}Sn_{15}$ and RF sputtering was used for the ZnS:20% $SiO_2$ target. The sputtering power was adjusted such that the sputtering rate ratio, R, from the ZnS:20% $SiO_2$ target to that from the $Sb_{75}In_{15}Sn_{15}$ target was about 0.61. The sputtering was carried out in about 7 mTorr of Ar and the thickness of the phase-change layer was about 12 nm. Onto the phase-change recording layer 22, a dielectric layer 23 was RF-sputtered from a ZnS:20% $SiO_2$ target. The sputtering pressure was about 7 mTorr and the thickness of the layer was about 73 nm. Onto the dielectric layer 23, a reflective layer 24 was DC-sputtered from a Al: 1% Cr target. The sputtering pressure was about 5 mTorr and the thickness of the layer was about 100nm. Finally, an UV-cured lacquer layer 25 was applied over the reflective layer 24 to provide mechanical protection for the recording element.

For comparison, another WORM recording element 20' was prepared according to FIG. 2. All the components and procedures were similar to the element described above except that the recording layer was prepared by sputtering from the $Sb_{75}In_{15}Sn_{15}$ target only. The recording layer had therefore a composition of $Sb_{75}In_{15}Sn_{15}$, similar to that in the target, and R=0.

The recording performance of the recording elements 20 and 20' was evaluated using a commercially available Pulstec DDU-1000 DVD tester equipped with a 635 nm wavelength laser and a 0.6 NA objective. A random EFM+ data pattern was recorded on the disk while it was spinning to yield a optical recording elements linear speed of 8.8 m/s, which is about 2.5 times the read speed of a standard DVD disk. A multi-pulse write-strategy was used: for shortest 3T marks a single layer pulse was used and for the longer nT marks, additional (n−3) pulses were added. The duration of the pulses were optimized to yield minimum read-back jitter values. The clock rate for the recording pulses were varied in order to yield recorded marks of different sizes. The recorded data were than read back on another Pulstec DDU-1000 DVD tester equipped with a 650 nm wavelength and a 0.6 NA objective. This latter tester has been calibrated against the reference tester for testing DVD media against specifications. The figure-of-merit used in the evaluation is the read-back data-to-clock jitter. The data-to-clock jitter number is a measure of uncertainty in reading back and decoding the recorded data. This quantity is expressed in nanoseconds and the smaller the jitter number the better is the recording performance.

Table 4 shows the dependence of read-back data-to-clock jitter, in nanoseconds, on the size of 3T marks for the two types of recording elements. The element 20' with R=0 used the prior art $Sb_{75}In_{15}Sn_{15}$ composition and the element 20 with R=0.61 used a phase-change recording layer according to the present invention. It is clearly seen that the measured data-to-clock jitter for the R =0.61 recording element was consistently lower than that for the R=0 recording element. The difference was more significant when smaller marks were made. Table 4 also lists a comparison of Carrier-to-Noise Ratio (CNR) for the two elements. The CNR was measured on single-tone, 3T-size mark recordings. Again the element using the present invention, 20, with R=0.61 showed much higher CNR than the element 20' using the prior art technology. For both elements, the recorded marks had lower reflectivity than the un-recorded region.

TABLE 4

| 3T Mark Size, μm | Data-to-Clock Jitter, nS | | CNR | |
|---|---|---|---|---|
| | R = 0 | R = 0.61 | R = 0 | R = 0.61 |
| 0.5 | 4.01 | 2.38 | 50.2 | 51.7 |
| 0.45 | 4.65 | 2.51 | 48.3 | 51.0 |
| 0.43 | 5.05 | 2.66 | 47.4 | 50.2 |
| 0.41 | 5.69 | 2.73 | 45.5 | 49.6 |

EXAMPLE 4

To further illustrate the effect of $ZnS:SiO_2$(20%) addition, a series of 33 disks were made using the structure and conditions described in Example 3. These disks were divided into six groups, each containing 5 or 6 disks. Each group had a different sputtering rate ratio R, ranging from 0 to 1.0 in about 0.2 increments. Within each group, the thickness T of the phase-change recording layer 23 was varied from disk to disk from about 8 nm to about 20 nm. Since the optical constants of the phase-change recording layer 23 depend on the sputtering rate ratio R. the thickness of the dielectric layer 22 was adjusted to achieve the optimum performance for each R values. The thickness of the dielectric layer varied from about 86 nm for R=0 to about 54 nm for R=1.0. The recording performance of these 33 disks were tested the same manner as described in Example 3, and the results are summarized in FIG. 6.

Figure 6:
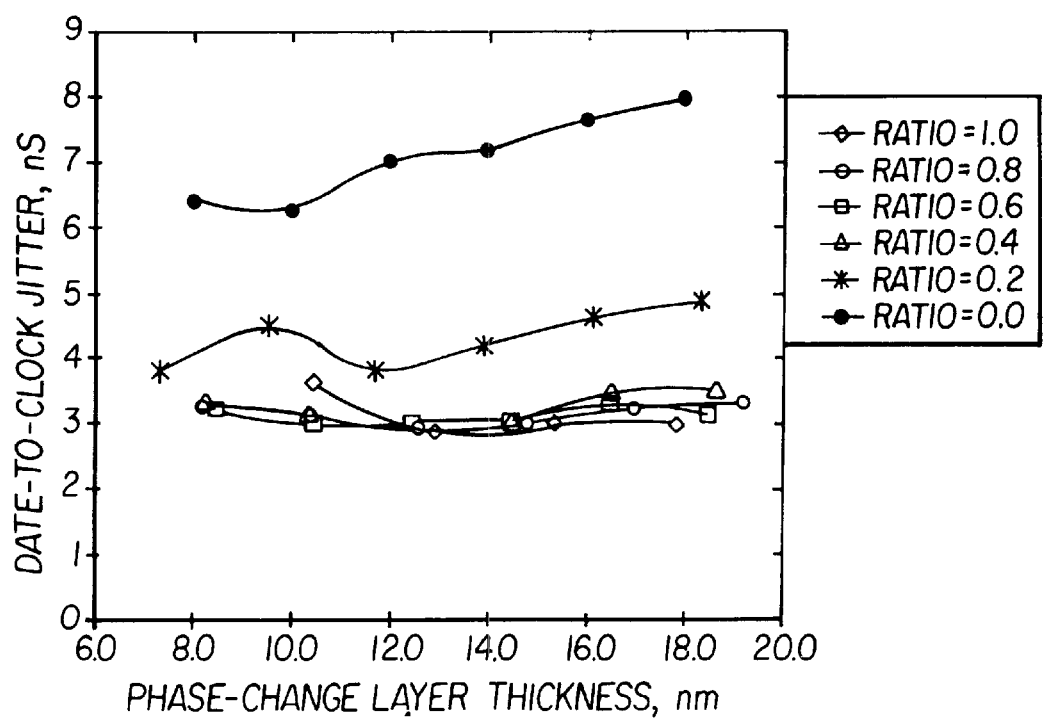
FIG. 6 is a plot showing the dependence of read back data-to-clock jitter on the sputtering rate ratio, R, and the phase-change layer thickness, T.

For all the 33 disks, the recorded marks had lower reflectivity than the un-recorded region. FIG. 6 shows the dependence of read-back data-to-clock jitter on sputtering rate ratio R and phase-change thickness T. The six curves represent six groups of disks with different sputtering rate ratios, and each points on the curves represents a different phase-change layer thickness. The disks with no mixing, R=0, have very high jitter values, too high to be useful as storage devices. A significant improvement in jitter values is observed when Zn, S, Si, and O were added to the SbSnIn alloy. The improvement is evident when R=0.2, and some improvement is expected even with smaller R values. The improvement becomes more significant with higher R values. The data-to-clock jitter values are found to be relatively independent of the phase-change recording layer thickness within the range of values used for this example. Other properties, however, do dependent on the phase-change thickness.

Figure 7:
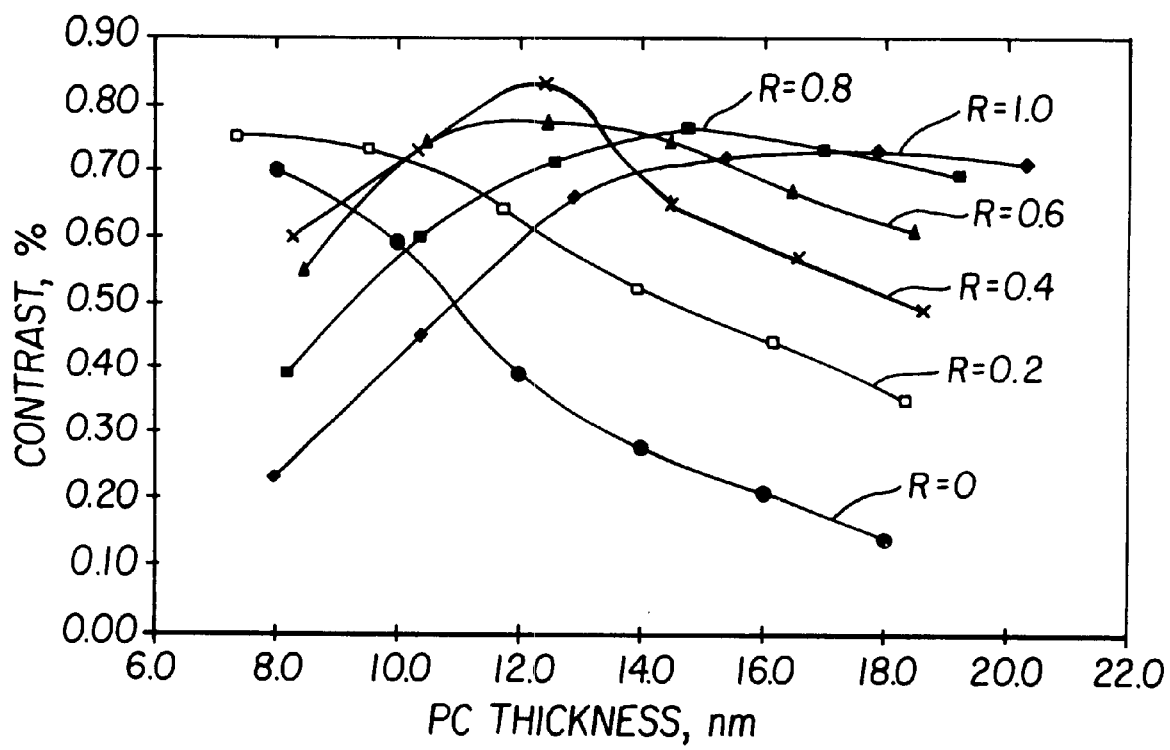
FIG. 7 is a plot showing the dependence of read-back contrast on the sputtering rate ratio, R, and the phase-change layer thickness, T.
Figure 8:
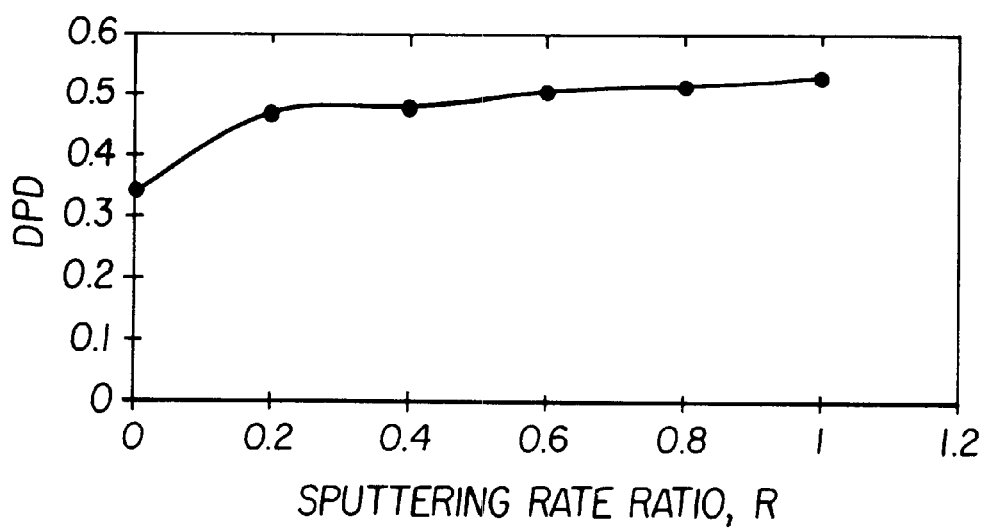
FIG. 8 is a plot showing the dependence of DPD tracking signal on the sputtering rate ratio, R, and the phase-change layer thickness, T.

FIG. 7 shows the dependence of read-back contrast on phase-change recording layer thickness. The optimum phase-change recording layer thickness for contrast was found to be less than 8 nm for R=0, and it increased with increasing R. For R=1.0, it was more than 14 nm. This change in optimum phase-change thickness is the result of the decrease of optical density when Zn, S, Si, and O are added to the $Sb_{100-m-n}In_mSn_n$ alloy. The DPD tracking signal was also found to have a similar phase-change recording layer thickness dependence as the read-back contrast. FIG. 8 shows the maximum DPD signal for each of the six groups of disks versus the R value of these groups. In is clear from this figure that the addition of Zn, S, Si, and O into the SbInSn alloy significantly improved the DPD signal strength.

EXAMPLE 5

Figure 9:
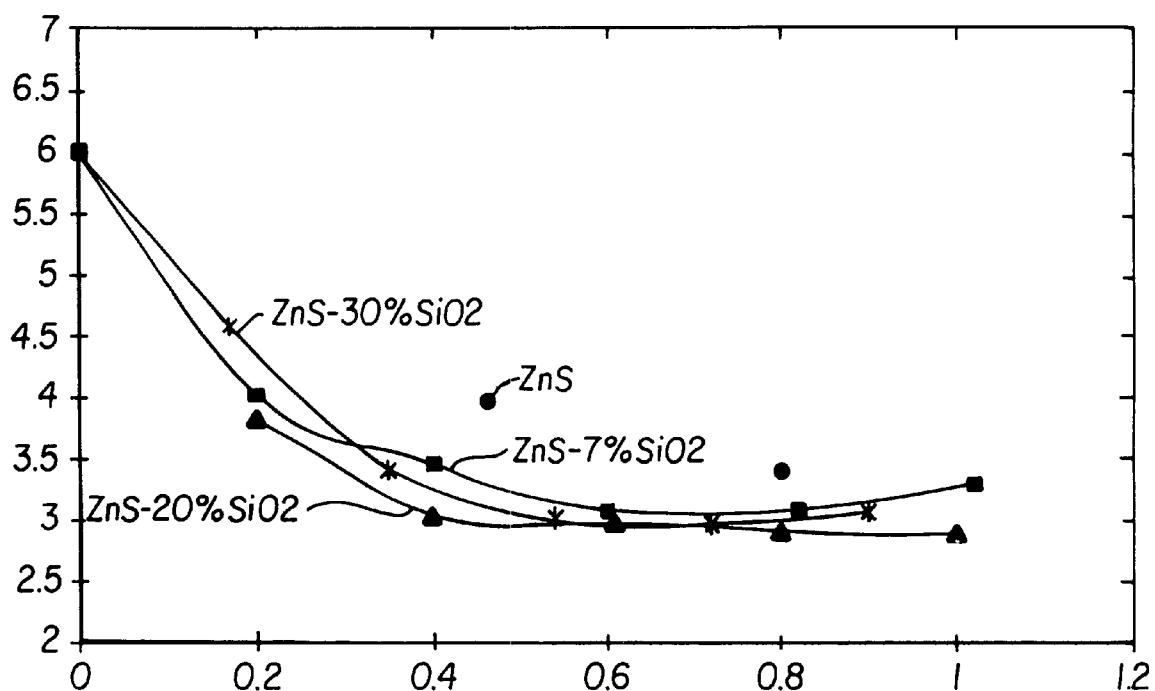
FIG. 9 is a plot showing the dependence of read out data-to-clock jitter on the sputtering rate ratio, R, and the composition of the ZnS:SiO$_2$ targets.

Four series of recording elements were constructed using structure and procedures similar to that used in Example 3. The composition of the $ZnS:SiO_2$ target, however, was different for each of the series, ranging from ZnS: 0% $SiO_2$ to $ZnS:30\%SiO_2$. Within each series, the sputtering rate ratio, R, was varied. The elements were evaluated in a manner similar to that used in the Example 3 and the results are summarized in FIG. 9. It is seen from these results that mixing even with ZnS caused an improvement in the data-to-clock jitter, but more improvement is observed when $SiO_2$ was present in the second target. There was no significant difference in performance between $ZnS:7\%SiO_2$ and $ZnS:30SiO_2$ and these results suggest that the usable ranges of concentration of $Sio_2$ in $ZnS:SiO_2$ is wider than the range studied in this example. The preferred composition range according to the present invention is estimated to be expressed by the formula $(Sb_{100-m-n}In_mSn_n)_{100-x}((ZnS)_{100-y}(SiO_2)_y)_x$, wherein 70>x>10, 40 >y>1, and m and n are selected such that the $Sb_{100-m-n}In_mSn_n$ alloy satisfies the composition range in FIG. 5.

These examples clearly demonstrate the beneficial effect of addition of Zn, S, Si, and O into the SbSnIn alloy in improving the recording performance. These examples are described in detail with particular reference to several preferred embodiments, but it will be understood that variations and modifications can be effected within the spirit and scope of the invention.

| PARTS LIST | |
|---|---|
| 10 | recording medium |
| 10' | recording element |
| 11 | substrate |
| 12 | recording layer |
| 13 | protecting layer |
| 20 | recording element |
| 20' | recording element |
| 21 | substrate |
| 22 | recording layer |
| 23 | dielectric layer |
| 24 | reflective layer |
| 25 | protective layer |
| 30 | recording element |
| 32 | reflective layer |
| 33 | dielectric layer |
| 34 | recording layer |
| 35 | protective layer |
| 40 | recording element |
| 41 | substrate |
| 42 | dielectric layer |
| 43 | recording layer |

-continued

| PARTS LIST | |
|---|---|
| 44 | dielectric layer |
| 45 | reflective layer |
| 46 | protective layer |

What is claimed is:

1. A WORM optical recording element comprising a substrate and a phase-change recording layer wherein the phase-change recording layer has a composition expressed by $Sb_aX_bSn_cZn_dSi_eO_fS_h$ wherein X is an element selected from In, Ge, Al, Zn, Mn, Cd, Ga, Ti, Si, Te, Nb, Fe, Co, W, Mo, S, Ni, O, Se, Tl, As, P, Au, Pd, Pt, Hf, or V and a>0, >0, c>0, d>0, e>0, f>0, h>0, and a+b+c+d+e+f+h=100.

2. A WORM optical recording element as in claim 1 wherein the X is In and the Sb, In, and Sn components have a ratio that satisfies the composition figure:

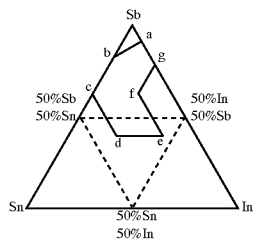

wherein the vertices are specified below:

| | Coordinates | | |
|---|---|---|---|
| Vertices | Sb | Sn | In |
| a | 97 | 0 | 3 |
| b | 85 | 15 | 0 |
| c | 60 | 40 | 0 |
| d | 48 | 42 | 10 |
| e | 44 | 10 | 46 |
| f | 64 | 5 | 31 |
| g | 70 | 0 | 30 |

3. A WORM optical recording element as in claim 1, wherein the Zn, S, Si, and O components satisfy the formula $(ZnS)_{100-y}(SiO_2)_y$ and 40>y>1.

4. A WORM optical recording element as in claim 1 wherein the phase-change recording layer is in the amorphous state before recording and the recorded marks are in the crystalline state.

5. A WORM optical recording element as in claim 1, wherein the recorded marks have lower reflectivity than the un-recorded areas.

* * * * *

UNITED STATES PATENT AND TRADEMARK OFFICE
CERTIFICATE OF CORRECTION

PATENT NO. : 6,605,330 B2  Page 1 of 1
DATED : August 12, 2003
INVENTOR(S) : Yuan-Sheng Tyan et al.

It is certified that error appears in the above-identified patent and that said Letters Patent is hereby corrected as shown below:

Column 13,
Lines 11-17, claim 1 reads,
"A WORM optical recording element comprising a substrate and a phase-change recording layer wherein the phase-change recording layer has a composition expressed by $Sb_aX_bSn_cZn_dSi_eO_fS_h$ wherein X is an element selected from In, Ge, Al, Zn, Mn, Cd, Ga, Ti, Si, Te, Nb, Fe, Co, W, Mo, S, Ni, O, Se, Tl, As, P, Au, Pd, Pt, Hf, or V and $a > 0, > 0, c > 0, d > 0, e > 0, f > 0, h>0$, and $a + b + c + d + e + f + h = 100$"

should read:
-- A WORM optical recording element comprising a substrate and a phase-change recording layer wherein the phase-change recording layer has a composition expressed by $Sb_aX_bSn_cZn_dSi_eO_fS_h$ wherein X is an element selected from In, Ge, Al, Zn, Mn, Cd, Ga, Ti, Si, Te, Nb, Fe, Co, W, Mo, S, Ni, O, Se, Tl, As, P, Au, Pd, Pt, Hf, or V and $a > 0, b > 0, c > 0, d > 0, e > 0, f > 0, h>0$, and $a + b + c + d + e + f + h = 100$. --

Signed and Sealed this

Twenty-fifth Day of November, 2003

JAMES E. ROGAN
*Director of the United States Patent and Trademark Office*